Feb. 22, 1927.
T. H. FOREHAND
ADJUSTABLE BEARING AND SHIM
Filed June 2, 1926
1,618,649
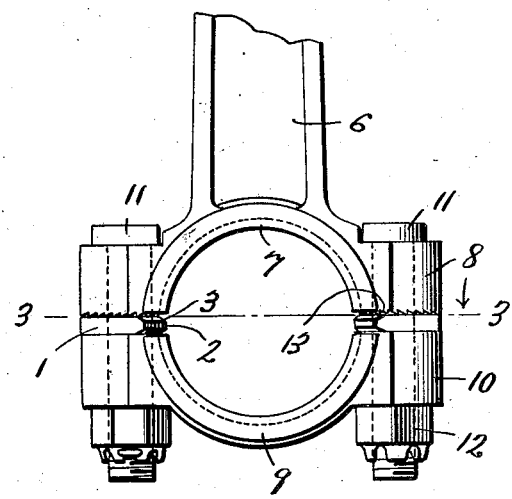
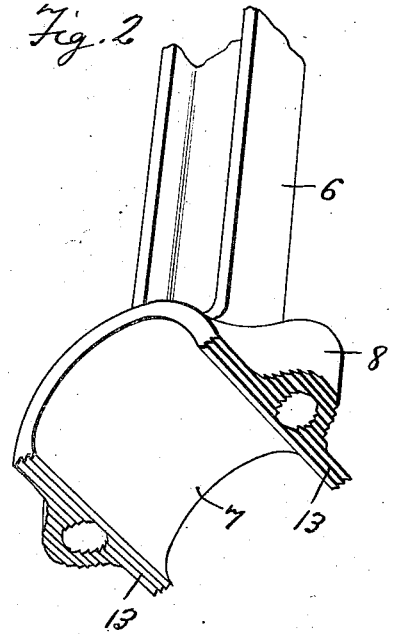
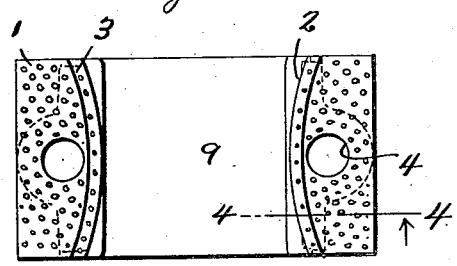
Inventor
Thomas H. Forehand,
By Clarence A. O'Brien,
Attorney Patented Feb. 22, 1927.

1,618,649

UNITED STATES PATENT OFFICE.

THOMAS H. FOREHAND, OF NASHVILLE, TENNESSEE.

ADJUSTABLE BEARING AND SHIM.

Application filed June 2, 1926. Serial No. 113,230.

The present invention relates to improvements in shims which are employed for taking up wear between bearings such as connecting rod bearings, main bearings and crank shaft bearings.

One of the important objects of the present invention is to provide a means for facilitating the adjustment of the shim without necessitating the removal of the same from the bearing or further necessitating the disassembly of the bearing.

A still further object of the invention is to provide an adjustable shim of the above mentioned character which is of such construction as will save considerable time and labor in taking up any loose play in the bearing, the bearing being provided with means for cutting or chipping a portion of the shim in order to obtain the proper adjustment of the latter.

A still further object of the invention is to provide an adjustable shim of the above mentioned character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming a part of this application and in which like numerals designate like parts throughout the several views:

Figure 1 is a side elevation of the adjustable shim embodying my invention showing the same associated with a connecting rod bearing.

Figure 2 is a fragmentary detail perspective view showing the cutting teeth formed on the connecting rod bearing, Figure 3 is a sectional view taken approximately on line 3—3 of Figure 1 showing the adjustable shims in top plan, and Figure 4 is a transverse section through the shim taken approximately on line 4—4 of Figure 3.

In the drawing wherein for the purpose of illustration is shown the preferred embodiment of my invention, the numeral 1 designates generally the shim, the same being formed preferably of brass, a pair of such shims are shown in the present illustration for use with a connecting rod bearing and the manner in which these shims are associated with the bearing will be hereinafter more fully described. The shim is preferably rectangular in design, one longitudinal edge thereof being slightly curved as illustrated at 2, and this longitudinally curved edge is beveled as illustrated at 3. The shim is provided with a central opening 4 for registry with the openings provided in the laterally extending ears formed on the connecting rod bearing. The upper face of the shim has formed therein a series of recesses or pockets 5 and this construction is clearly shown in Figures 3 and 4 of the drawing. The bearing formed on the lower end of the connecting rod 6 is of the usual construction and is designated by the numeral 7, the laterally extending ears formed on the respective sides of the bearing being illustrated at 8. The cap member which is complemental with the bearing 7 is indicated at 9 and the laterally extending ears are associated with the cap member are illustrated at 10. The cap member is secured to the bearing 7 by the usual bolts 11 which extend through the registering openings provided in the laterally extending ears of the bearing and cap respectively, and the lock nuts 12 are threaded on the lower threaded ends of the bolts in the usual manner.

In order that my improved shim may be associated with the bearing 7, the bottom edges of the bearing as well as the bottom face of the laterally extending ears 8 are serrated longitudinally to form the cutting edges 13 and this construction is clearly shown in Figure 2 of the drawing.

The shims are placed between the adjacent faces of the respective ears formed on the bearing 7 and the cap member 9 and the securing bolts 11 extend through the central openings 4 provided in the shims and this construction provides a means whereby the shims are pivotally supported between the ears of the bearings and the ears of the cap member. The longitudinally curved and beveled edges of the shims are disposed inwardly.

In order that any loose play which may occur between the bearing and the cap may be taken up, one end of each shim which extends outwardly of the sides of the bearing and cap member is tapped with a hammer and as the shim moves inwardly depending upon which side of the shim is tapped, the cutting edges 13 will chip a portion of the upper face of the shim and thus provide what may be termed as a wedging action between the bearing and the cap member. The loose particles or chips which result from the cutting of the upper surface of the shims by the cutting teeth or edges 13 will enter the several pockets 5 formed in the upper surface of the shims so that the shims will fit properly between the bearing and the cap member and no unevenness will take place.

The provision of a shim of the above mentioned character will save considerable time and labor in tightening the bearings and will furthermore obviate the necessity of having to remove or disarrange any part of the bearing in order to properly adjust the shim. Furthermore, the present shim may be used not only with connecting rod bearings, but with main shaft bearings and crank shaft bearings, and will at all times be positive and efficient in carrying out the purposes for which the same is designed.

While I have shown the preferred embodiment of my invention it is to be understood that minor changes in the size, shape, and arrangement of parts may be resorted to without departing from the spirit and scope of the appended claims.

Having thus described the invention, what I claim as new and desire to secure by Letters Patent is:—

1. In combination with a bearing and its complementary cap member, a shim disposed between the bearing and said cap member, the bottom edges of the bearing having cutting teeth for cutting into the adjacent face of the shim whereby loose play between the bearing and the cap member will be taken up 2. In combination with a bearing and its complementary cap member, and the laterally extending ears associated with the bearing and the cap member respectively, a shim disposed between each pair of ears and adapted for pivotal movement on the securing bolts which extend through the ears, cutting teeth formed on the bottom edges of the bearing and the bottom faces of the lateral ears of said bearing, said teeth being adapted to cut into the upper face of each shim when the shims are moved inwardly whereby loose play between the bearings and the cap member will be taken up.

3. In combination with a bearing and its complemental cap member, and the ears which extend laterally from the bearing in the cap member, and through which ears extend the securing bolts, a shim interposed between the respective ears on the bearing and cap member, said shims being adapted for pivotal movement on the bolt, cutting teeth formed on the bottom edges of the bearing and the bottom faces of the lateral ears formed on said bearing, said cutting teeth being adapted to cut into the upper surface of the shims when the same are swung inwardly, each shim being provided with pockets in its upper face for receiving the cuttings which result from said aforementioned cutting action.

4. In combination with a bearing and its complementary cap member, a shim disposed between the bearing and said cap member, the inner longitudinal edge of said shim being curved and beveled, the bottom edges of the bearing having cutting teeth for cutting into the adjacent face of the shim whereby loose play between the bearing and the cap member will be taken up when the shim is moved inwardly between the bearing and the cap member.

In testimony whereof I affix my signature.

THOMAS H. FOREHAND.